UNITED STATES PATENT OFFICE

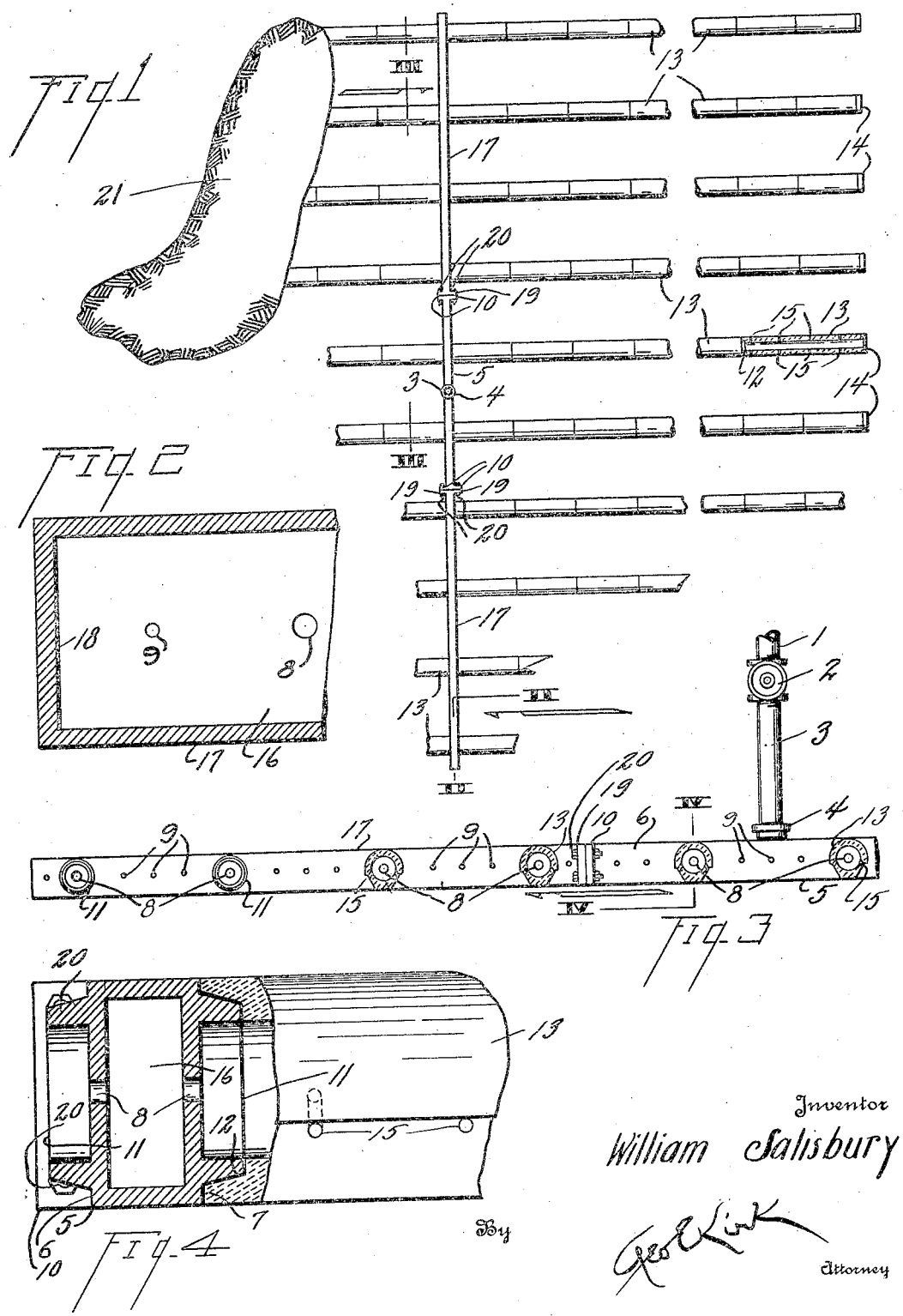

WILLIAM SALISBURY, OF TOLEDO, OHIO

APPARATUS FOR TREATING SOIL

Application filed December 13, 1930. Serial No. 502,054.

This invention relates to soil treatment.

This invention has utility when incorporated in apparatus for the distribution of fluids in soil.

Referring to the drawing:

Fig. 1 is a plan view, parts being broken away, of a soil treating installation embodying features of the invention herein;

Fig. 2 is a view on the line II—II, Fig. 1;

Fig. 3 is a view on the line III—III, Fig. 1; and

Fig. 4 is a view on the line IV—IV, Fig. 3.

The invention herein is used to effectively distribute fluids throughout the soil of an area to be treated. The apparatus may distribute steam in a plant bed so that harmful bacteria is destroyed or it may be used to distribute water for sub-irrigation with or without fertilizer. The apparatus distributes the fluids evenly and thoroughly without causing puddles or leaving dry spots. Oversaturation to a single point is prevented.

The invention also embodies features permitting ready installation and insuring proper assembly of the various units. Further, the apparatus is adaptable to various size plats and the interchangeable units augmented by additional units may be distributed to reach all parts of any size or shape bed.

Fluid supply conduit 1 extends to valve 2 from which conduit or line 3 has threaded connection with annular flange or collar 4 carried by conduit or header section 5. The header section 5 is polygonal in cross section providing flat sides 6, 7, having a series of openings 8 therethrough together with a series of smaller openings 9.

The header section 5 is provided at each end with perforated ears 10 extending from the sides 6, 7. Surrounding each opening 8 is tapered boss 11 with which seat 12 of tile 13 may have slip fit connection. The tile elements 13 form a branch conduit or line extending away from the header with the opening 8 forming a restricted passage for fluid from the header thereinto. The opposite end of the line may be closed by cap 14.

Openings 15 in the tile allow escape of the fluid into the surrounding soil. The branch lines are spaced apart only so far as to insure the discharged fluid reaching all the soil therebetween. The openings 9 open directly from the header interior 16 into the soil so that the soil thereabout will be thoroughly treated.

Attached to the header section 5 are sections 17 as continuations of the passageway 16. These sections 17 are provided with closed end 18 and ears 19 extending from the sides 6, 7. The ears 19 also being perforated permit bolts 20 to extend therethrough and through ears 10 for maintaining assembly. These pocket shaped sections 17 are also provided with openings 8 and 9 together with bosses 11 about the openings 8 all in their definitely spaced relationship.

The section 5 may be of various lengths determining the extent of reach of the passageway 16. The sections 17 are interchangeable as well as the tile elements.

There is thus provided a fluid dispersing system adaptable for even distribution of a plurality of discharge lines over any desired area embodying a minimum of different shaped units. The fluid is at the same time prevented from escape at points not needed or desired.

The header sections may be cast iron and may be cast to form without additional machining. They are buried in the soil 21 at a depth determined by the soil quality.

The sides 6, 7, with the openings 8 therethrough into the continuing lines serves as baffles insuring an even distribution of the fluid throughout the line lengths.

When not used as a soil treating system, the lines may be used for drainage.

What is claimed and it is desired to secure by United States Letters Patent is:

1. A header for soil treating apparatus comprising a conduit open at one end and provided with a flange adjacent said open end, an inlet into said conduit intermediate its ends, a second conduit closed at one end and open at the other, a flange adjacent the open end of said second conduit, means for engaging said flanges to connect said conduits together to form a chamber, said conduits being provided with a series of different diameter openings therethrough, and a boss integral with one of said conduits about one of said openings.

2. A header for soil treating apparatus comprising a conduit open at one end and provided with a flange adjacent said open end, an inlet into said conduit intermediate its ends, a second conduit closed at one end and open at the other, a flange adjacent the open end of said second conduit, means for engaging said flanges to connect said conduits together to form a chamber, said conduits being provided with a series of different diameter openings therethrough, and bosses integral with said conduits about a portion of said openings.

3. A header for soil treating apparatus comprising a conduit having a passageway therethrough, said conduit having an opening through one of its side walls of less capacity than the passageway, and a boss integral with said header extending about said opening adapted to have slip fit connection with a branch conduit of greater capacity than the opening.

4. A header for soil treating apparatus comprising a first conduit open at each end and provided with a flange adjacent each of the open ends, an inlet in said conduit intermediate the ends, a pair of conduits each closed at one end and open at the other, a flange at the open end of each of said pair of conduits, means engaging the flanges to connect one of said pair of conduits to each end of the first conduit to form a continuous passage way through said conduits and closed at each end, said conduits having a series of openings therethrough, and bosses integral with the conduits about a portion of said series of openings.

5. A header for soil treating apparatus comprising a first conduit open at each end and having a cross-sectional shape to provide a flat side, an inlet to said conduit intermediate the ends, a pair of like conduit sections open at one end and closed at the other also having cross-sectional shapes to provide a flat side, means assembling said first conduit with one of the pair of conduits on each end thereof to provide a continuous passage-way therethrough closed at the ends, said conduits providing a continuous flat side having a definitely spaced series of openings therethrough communicating with the passageway, and a definite series of bosses integral with the conduits about a portion of said openings.

In witness whereof I affix my signature.

WILLIAM SALISBURY.